United States Patent
Miyake et al.

(10) Patent No.: US 8,456,879 B2
(45) Date of Patent: Jun. 4, 2013

(54) SWITCHING POWER SUPPLY APPARATUS

(75) Inventors: Eiji Miyake, Ehime (JP); Akeyuki Komatsu, Ehime (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 12/935,177

(22) PCT Filed: Apr. 7, 2009

(86) PCT No.: PCT/JP2009/001596
§ 371 (c)(1),
(2), (4) Date: Sep. 28, 2010

(87) PCT Pub. No.: WO2009/128217
PCT Pub. Date: Oct. 22, 2009

(65) Prior Publication Data
US 2011/0019448 A1    Jan. 27, 2011

(30) Foreign Application Priority Data
Apr. 15, 2008  (JP) ................... 2008-105212

(51) Int. Cl.
*H02M 7/5387*  (2007.01)
(52) U.S. Cl.
USPC .............................. 363/132; 363/16; 323/290
(58) Field of Classification Search
USPC ............. 323/222, 233, 235, 358, 282–290; 363/16–20, 24–26, 56.04, 56.08, 98, 132, 363/89; 315/224, 291, 307
See application file for complete search history.

(56) References Cited

U.S. PATENT DOCUMENTS

| 4,926,302 | A |   | 5/1990 | Harada et al. |
| 5,019,770 | A | * | 5/1991 | Harada et al. ............... 323/282 |
| 5,107,151 | A | * | 4/1992 | Cambier ....................... 327/432 |
| 5,111,378 | A | * | 5/1992 | Nowak et al. ................. 363/98 |
| 5,388,040 | A | * | 2/1995 | Hall .............................. 363/16 |
| 5,923,550 | A | * | 7/1999 | Kumar ........................... 363/69 |

FOREIGN PATENT DOCUMENTS

| JP | 63-277425 | 11/1988 |
| JP | 2002-345155 | 11/2002 |

* cited by examiner

*Primary Examiner* — Rajnikant Patel
(74) *Attorney, Agent, or Firm* — Hamre, Schumann, Mueller & Larson, P.C.

(57) ABSTRACT

Provided is a switching power supply apparatus capable of suppressing heat generation from a power supply to improve the efficiency of conversion during a power supply operation and accurately detecting only a current flowing through a load to achieve more stabile control. Since a first closed loop made up of a fourth diode (27d), a third inductor (25c) and a fourth electronic switch (24d) and a second closed loop made up of a second diode (27b), a first inductor (25a) and a second electronic switch (24b) do not include a fourth inductor (25d) and a second inductor (25b) through which an AC output current supplied to a load (28) flows, an unnecessary current does not flow through the first or second closed loop.

8 Claims, 3 Drawing Sheets

SWITCHING POWER SUPPLY APPARATUS

TECHNICAL FIELD

The present invention relates to a switching power supply apparatus controlling a switching operation on a DC power supply to control an output supplied to a load.

BACKGROUND ART

Switching power supply apparatuses have been widely used as power supply apparatuses for electronic devices such as consumer electronic appliances. The switching power supply apparatuses are used for the purpose of improving power efficiency with a reduction in power consumption. The switching power supply apparatus uses a switching operation of a switching element to control an output to be supplied to a load. The switching operation is repetitive switching between on and off. The switching element may be an electronic switch, for example. The control of an output indicates, for example, the stabilization of an output.

A conventional switching power supply apparatus will be described with reference to a drawing.

FIG. 4 is a circuit diagram illustrating the configuration of the conventional switching power supply apparatus.

As illustrated in FIG. 4, a conventional switching power supply apparatus 1 includes an input terminal 3a to which the positive side of a DC power supply 2 is connected, an input terminal 3b to which the negative side of the DC power supply 2 is connected, an electronic switch 4a and a diode 5a which are connected in series between the input terminals 3a and 3b, a diode 5b and an electronic switch 4b which are connected in series between the input terminals 3a and 3b, an inductor 6a having one end connected to the connection point between the electronic switch 4a and the diode 5a, an inductor 6b having one end connected to the connection point between the diode 5b and the electronic switch 4b, an output terminal 8a to which the other ends of the inductors 6a and 6b are connected and one end of a load 7 is connected, a diode 5d and an electronic switch 4d which are connected in series between the input terminals 3a and 3b, an electronic switch 4c and a diode 5c which are connected in series between the input terminals 3a and 3b, an inductor 6c having one end connected to the connection point between the electronic switch 4c and the diode 5c, an inductor 6d having one end connected to the connection point between the diode 5d and the electronic switch 4d, an output terminal 8b to which the other ends of the inductors 6c and 6d are connected and the other end of the load 7 is connected, a capacitor 9 connected between the output terminals 8a and 8b, and an electronic switch control circuit 10 for controlling the on/off control terminals of the electronic switches 4a, 4b, 4c and 4d.

The electronic switch control circuit 10 provides two outputs. One of the outputs controls the on/off control terminals of the electronic switches 4a and 4d and the other output controls the on/off control terminals of the electronic switches 4c and 4b.

An operation of the conventional switching power supply apparatus 1 configured thus will be described. For example, the case of an AC output with a frequency of 50 Hz being generated from a DC output supplied from the DC power supply 2 will be described.

The electronic switch control circuit 10 generates a square wave with a frequency of 20 kHz. In the first half cycle (10-msec) period of a frequency of 50 Hz, the electronic switches 4a and 4d perform a switching operation at 20 kHz whereas the electronic switches 4c and 4b stay in the off state. Accordingly, a current flows in the direction of arrow 11a.

In the next half cycle (10-msec) period, the electronic switches 4c and 4b perform a switching operation at 20 kHz and the electronic switches 4a and 4d stay in the off state. Accordingly, a current flows in the direction of arrow 11b.

In this way, a current flows in the direction of arrow 11a in the first half cycle (10-msec) period and a current flows in the direction of arrow 11b in the next half cycle (10-msec) period. This operation is repeated every half cycle of a frequency of 50 Hz. To be specific, repetitive alternation between the first half cycle period in which a current flows in the direction of arrow 11a and the second half cycle period in which a current flows in the direction of arrow 11b generates an alternating current with a frequency of 50 Hz between the output terminals 8a and 8b.

The inductors 6a and 6d and the capacitor 9 form a first low-pass filter whereas the inductors 6c and 6b and the capacitor 9 form a second low-pass filter. The first and second low-pass filters attenuate harmonic components caused by the switching operation at a frequency of 20 kHz. As a result, the alternating current generated between the output terminals 8a and 8b becomes a 50-Hz sinusoidal wave which oscillates smoothly.

The inductors 6a, 6b, 6c and 6d limit a surge current generated when the electronic switches 4a and 4d and the electronic switches 4c and 4b turn on and off.

The inductors 6a and 6b are inserted in series in a series circuit made up of the DC power supply 2 and the electronic switches 4a and 4b. The inductors 6c and 6d are inserted in series in a series circuit made up of the DC power supply 2 and electronic switches 4c and 4d. Accordingly, the DC power supply 2 is not shorted even if the electronic switches 4a and 4b or electronic switches 4d and 4c are turned on at the same time when the electronic switches performing a switching operation switch.

Prior art information relating to the present invention is disclosed in Patent Literature 1, for example. From page 3, upper right column, line 2, to page 3, lower left column, line 8, of patent literature 1, there is a description of inserting a coil between switching elements that alternately turn on and off, in order to prevent current and voltage surges caused by simultaneous switching on of the switching elements and also prevent damage to the switching elements due to a short-circuit current.

CITATION LIST

Patent Literature

Patent Literature 1: Japanese Patent Application Laid-Open No. 63-277425

SUMMARY OF INVENTION

Technical Problem

However, all of the electronic switches 4a, 4b, 4c and 4d perform a switching operation at a high frequency in the conventional switching power supply apparatus 1. In general, when an electronic switch performs a switching operation at a high frequency, a current flowing through the electronic switch overlaps a voltage applied to the electronic switch. The overlap means a switching loss. In addition, since the number of switching operations per unit time is large, the frequency of the overlap is high. Consequently, switching losses during an operation period in the conventional switching power supply apparatus 1, in which the four electronic switches perform a switching operation at a high frequency, are extremely large.

The operation of the conventional switching power supply apparatus 1 will be described in which the electronic switches 4b and 4d are switched between on and off states every half cycle at a frequency of 50 Hz and only the electronic switches 4a and 4c are switched at a high frequency in order to reduce switching losses. Even when the electronic switches are operated in this way, the first half cycle period in which a current flows in the direction of arrow 11a and a second half cycle period in which a current flows in the direction of arrow 11b are repeated and an AC output to the load 7 is generated.

First, in the first half cycle (10-msec) period at a frequency of 50 Hz, a current flows in the direction of arrow 11a. In the half cycle period, the electronic switch 4d stays in the on state, the electronic switches 4b and 4c stay in the off state, and the electronic switch 4a performs a switching operation at a frequency of 20 kHz.

When the electronic switch 4a is in the on state in this period, a current flows from the positive side of the DC power supply 2 to the input terminal 3a, the electronic switch 4a, the inductor 6a, the output terminal 8a, the load 7, the output terminal 8b, the inductor 6d, the electronic switch 4d, the input terminal 3b and the negative side of the DC power supply 2 in this order. On the other hand, when the electronic switch 4a is in the off state, a closed loop is formed by the diode 5a, the inductor 6a, the output terminal 8a, the load 7, the output terminal 8b, the inductor 6d and the electronic switch 4d and energy (current) accumulated in the inductors 6a and 6d is released through the closed loop. However, charge has been stored in the capacitor 9 and, when the closed loop is formed, the potential at the output terminal 8b becomes negative compared with the potential at the input terminal 3b connected to the negative side of the DC power supply 2 and a current flows through the diode 5c to the inductor 6c. Thus, an unnecessary current that does not pass through the load 7 flows along another closed loop formed by the inductor 6d, the electronic switch 4d, the diode 5c and the inductor 6c.

Similarly, in the next half cycle (10-msec) period, an unnecessary current flows as described above.

As has been described, the conversion efficiency of the switching power supply apparatus 1 decreases due to the unnecessary current. In addition, disadvantageously, the switching power supply apparatus 1 generates heat since the unnecessary current is consumed in the form of heat energy.

In the case where a current flowing through the load is detected by a current detecting section 32, the detected value is fed back (not shown) to the electronic switch control circuit 10, and a switching operation of each electronic switch is controlled on the basis of the detected value fed back to the electronic switch control circuit 10 to control the load current, an excess loop current that does not flow through the load as described above passes through the current detecting section 32. Therefore, a current flowing through the load 7 is not accurately detected, which may result in unstable control.

The present invention solves the above-described conventional problems and provides a switching power supply apparatus capable of preventing the generation of an unnecessary current to suppress heat generation from a power supply, thereby improving conversion efficiency during the operation of the power supply, and capable of accurately detecting only a current flowing through a load to achieve more stable control when a switching operation is controlled by detecting the current flowing through the load.

Solution to Problem

To solve the problems, a first switching power supply apparatus of the present invention for converting a first output having a DC waveform supplied from a DC power supply to a second output having an AC waveform and supplying the second output to a load, the first switching power supply apparatus includes: a first series connection unit in which a first electronic switch, a first inductor and a second electronic switch are connected in this order, an end on the first electronic switch side is connected to the positive side of the DC power supply and an end on the second electronic switch side is connected to the negative side of the DC power supply; a first diode having a cathode connected to the positive side of the DC power supply and an anode connected to the connection point between the first inductor and the second electronic switch; a second diode having an anode connected to the negative side of the DC power supply and a cathode connected to the connection point between the first electronic switch and the first inductor; a second inductor having one end connected to the connection point between the first inductor and the second electronic switch; a second series connection unit in which a third electronic switch, a third inductor and a fourth electronic switch are connected in this order, an end on the third electronic switch side is connected to the positive side of the DC power supply and an end on the fourth electronic switch side is connected to the negative side of the DC power supply; a third diode having a cathode connected to the positive side of the DC power supply and an anode connected to the connection point between the third inductor and the fourth electronic switch; a fourth diode having an anode connected to the negative side of the DC power supply and a cathode connected to the connection point between the third electronic switch and the third inductor; a fourth inductor having one end connected to the connection point between the third inductor and the fourth electronic switch; a capacitor connected between the other end of the second inductor and the other end of the fourth inductor; and an electronic switch control circuit for causing only the first electronic switch to perform a switching operation during a period in which the second electronic switch is held in an off state and the fourth electronic switch is held in an on state and causing only the third electronic switch to perform a switching operation during a period in which the second electronic switch is held in an on state and the fourth electronic switch is held in an off state, wherein the load is connected between the other end of the second inductor and the other end of the fourth inductor, and the electronic switch control circuit causes the first and third electronic switches to repeatedly switch between on and off at a frequency higher than the frequency of the second output supplied to the load and causes the second and fourth electronic switches to alternately switch between an on state and an off state at the frequency of the second output.

A second switching power supply apparatus of the present invention for converting a first output having a DC waveform supplied from a DC power supply to a second output having an AC waveform and supplying the second output to a load, the second switching power supply apparatus includes: a first series connection unit in which a first electronic switch, a first inductor and a second electronic switch are connected in this order, an end on the first electronic switch side is connected to the positive side of the DC power supply and an end on the second electronic switch side is connected to the negative side of the DC power supply; a first diode having a cathode connected to the positive side of the DC power supply and an anode connected to the connection point between the first inductor and the second electronic switch; a second diode having an anode connected to the negative side of the DC power supply and a cathode connected to the connection point between the first electronic switch and the first inductor; a second inductor having one end connected to the connection point between the first inductor and the second electronic switch; a second series connection unit in which a third electronic switch, a third inductor and a fourth electronic switch are connected in this order, an end on the third electronic switch side is connected to the positive side of the DC power supply and an end on the fourth electronic switch side is connected to the negative side of the DC power supply; a third diode having a cathode connected to the positive side of the DC power supply and an anode connected to the connection point between the third indictor and the fourth electronic switch; a fourth diode having an anode connected to the negative side of the DC power supply and a cathode connected to the connection point between the third electronic switch and the third inductor; a fourth inductor having one end connected to the connection point between the third inductor and the fourth electronic switch; a capacitor connected between the other end of the second inductor and the other end of the fourth inductor; and an electronic switch control circuit for causing only the second electronic switch to perform a switching operation during a period in which the first electronic switch is held in an off state and the third electronic switch is held in an on state and causing only the fourth electronic switch to perform a switching operation during a period in which the first electronic switch is held in an on state and the third electronic switch is held in an off state, wherein the load is connected between the other end of the second inductor and the other end of the fourth inductor, and the electronic switch control circuit causes the second and fourth electronic switches to repeatedly switch between on and off at a frequency higher than the frequency of the second output supplied to the load and causes the first and third electronic switches to alternately switch between an on state and an off state at the frequency of the second output.

A third switching power supply apparatus of the present invention for converting a first output having a DC waveform supplied from a DC power supply to a second output having an AC waveform and supplying the second output to a load, the third switching power supply apparatus includes: a first series connection unit in which a first electronic switch, a first inductor and a second electronic switch are connected in this order, an end on the first electronic switch side is connected to the positive side of the DC power supply and an end on the second electronic switch side is connected to the negative side of the DC power supply; a first diode having a cathode connected to the positive side of the DC power supply and an anode connected to the connection point between the first inductor and the second electronic switch; a second diode having an anode connected to the negative side of the DC power supply and a cathode connected to the connection point between the first electronic switch and the first inductor; a second inductor having one end connected to the connection point between the first inductor and the second electronic switch; a second series connection unit in which a third electronic switch, a third inductor and a fourth electronic switch are connected in this order, an end on the third electronic switch side is connected to the positive side of the DC power supply and an end on the fourth electronic switch side is connected to the negative side of the DC power supply; a third diode having a cathode connected to the positive side of the DC power supply and an anode connected to the connection point between the third indictor and the fourth electronic switch; a fourth diode having an anode connected to the negative side of the DC power supply and a cathode connected to the connection point between the third electronic switch and the third inductor; a fourth inductor having one end connected to the connection point between the third inductor and the fourth electronic switch; a first capacitor connected between the other end of the second inductor and the negative side of the DC power supply; a second capacitor connected between the other end of the fourth inductor and the negative side of the DC power supply; and an electronic switch control circuit for causing only the first electronic switch to perform a switching operation during a period in which the second electronic switch is held in an off state and the fourth electronic switch is held in an on state and causing only the third electronic switch to perform a switching operation during a period in which the second electronic switch is held in an on state and the fourth electronic switch is held in an off state, wherein the load is connected between the other end of the second inductor and the other end of the fourth inductor, and the electronic switch control circuit causes the first and third electronic switches to repeatedly switch between on and off at a frequency higher than the frequency of the second output supplied to the load and causes the second and fourth electronic switches to alternately switch between an on state and an off state at the frequency of the second output.

A fourth switching power supply apparatus of the present invention for converting a first output having a DC waveform supplied from a DC power supply to a second output having an AC waveform and supplying the second output to a load, the fourth switching power supply apparatus includes: a first series connection unit in which a first electronic switch, a first inductor and a second electronic switch are connected in this order, an end on the first electronic switch side is connected to the positive side of the DC power supply and an end on the second electronic switch side is connected to the negative side of the DC power supply; a first diode having a cathode connected to the positive side of the DC power supply and an anode connected to the connection point between the first inductor and the second electronic switch; a second diode having an anode connected to the negative side of the DC power supply and a cathode connected to the connection point between the first electronic switch and the first inductor; a second inductor having one end connected to the connection point between the first inductor and the second electronic switch; a second series connection unit in which a third electronic switch, a third inductor and a fourth electronic switch are connected in this order, an end on the third electronic switch side is connected to the positive side of the DC power supply and an end on the fourth electronic switch side is connected to the negative side of the DC power supply; a third diode having a cathode connected to the positive side of the DC power supply and an anode connected to the connection point between the third indictor and the fourth electronic switch; a fourth diode having an anode connected to the negative side of the DC power supply and a cathode connected to the connection point between the third electronic switch and the third inductor; a fourth inductor having one end connected to the connection point between the third inductor and the fourth electronic switch; a first capacitor connected between the other end of the second inductor and the negative side of the DC power supply; a second capacitor connected between the other end of the fourth inductor and the negative side of the DC power supply; and an electronic switch control circuit for causing only the second electronic switch to perform a switching operation during a period in which the first electronic switch is held in an off state and the third electronic switch is held in an on state and causing only the fourth electronic switch to perform a switching operation during a period in which the first electronic switch is held in an on state and the third electronic switch is held in an off state, wherein the load is connected between the other end of the second inductor and the other end of the fourth inductor, and the electronic switch control circuit causes the second and fourth electronic switches to repeatedly switch between on and off at a frequency higher than the frequency of the second output supplied to the load and causes the first and third electronic switches to alternately switch between an on state and an off state at the frequency of the second output.

In one of the first and third switching power supply apparatuses of the present invention, the DC power supply may be a solar cell, the load may be a commercial AC power supply, and the electronic switch control circuit may control a time at which the second and fourth electronic switches switch between on and off states, on the basis of the frequency of the commercial AC power supply.

In one of the second and fourth switching power supply apparatuses of the present invention, the DC power supply may be a solar cell, the load may be a commercial AC power supply, and the electronic switch control circuit may control a time at which the first and third electronic switches switch between on and off states, on the basis of the frequency of the commercial AC power supply.

Advantageous Effects of Invention

According to the preferred embodiments of the present invention, the fourth and second inductors through which the second output with an alternating-current waveform supplied to the load flows are not included in a first closed loop made up of the fourth diode, the third inductor and the fourth electronic switch and a second closed loop made up of the second diode, the first inductor and the second electronic switch. Accordingly, an unnecessary current does not flow through the first or second closed loop.

Therefore, heat generation from the power supply can be suppressed to improve conversion efficiency during a power supply operation. In addition, when a switching operation is controlled by detecting a current flowing through the load, only the current flowing through the load can be accurately detected to achieve more stable control.

DESCRIPTION OF EMBODIMENTS

Switching power supply apparatuses according to embodiments of the present invention will be described specifically with reference to the drawings.

First Embodiment

A switching power supply apparatus according to a first embodiment of the present invention will be described first.

Figure 1:
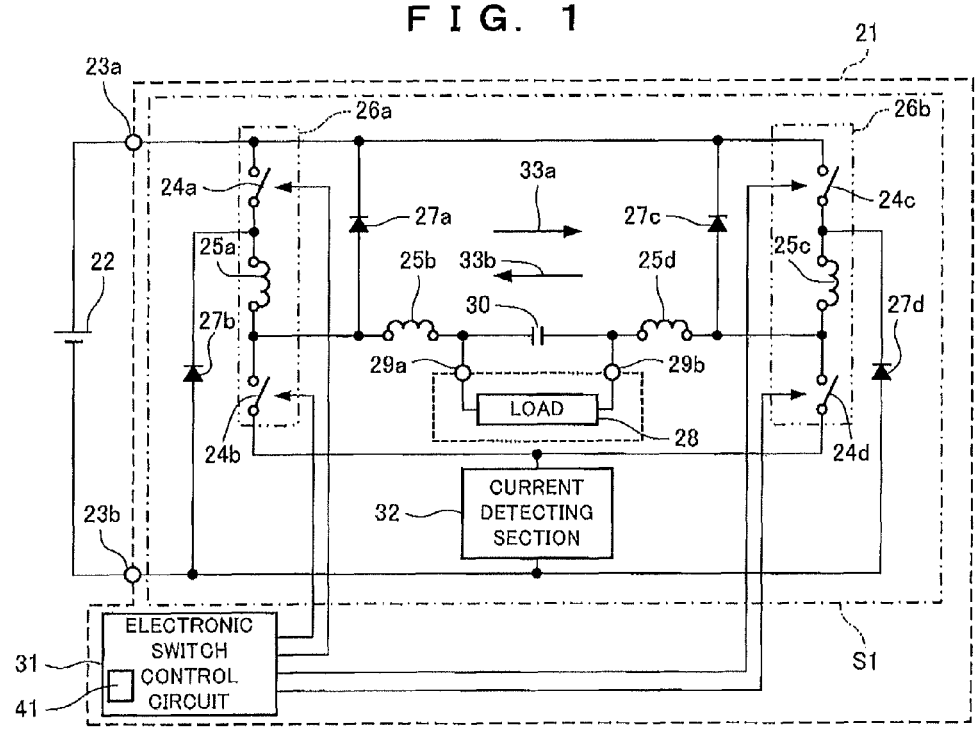
FIG. 1 is a circuit diagram illustrating a configuration example of a switching power supply apparatus according to a first embodiment of the present invention.

FIG. 1 is a circuit diagram illustrating a configuration example of the switching power supply apparatus according to the first embodiment of the present invention. As illustrated in FIG. 1, a switching power supply apparatus 21 of the present invention includes: an input terminal 23a to which the positive side of a DC power supply 22 is connected; an input terminal 23b to which the negative side of the DC power supply 22 is connected; a series connection unit 26a in which an electronic switch 24a, an inductor 25a and an electronic switch 24b are connected in this order, an end on the electronic switch 24a side is connected to the input terminal 23a and an end on the electronic switch 24b side is connected to the input terminal 23b; a diode 27a having a cathode connected to the input terminal 23a and an anode connected to the connection point between the inductor 25a and the electronic switch 24b; a diode 27b having an anode connected to the input terminal 23b and a cathode connected to the connection point between the inductor 25a and the electronic switch 24a; an inductor 25b having one end connected to the connection point between the inductor 25a and the electronic switch 24b; an output terminal 29a to which the other end of the inductor 25b and one end of a load 28 are connected; a series connection unit 26b in which an electronic switch 24c, an inductor 25c and an electronic switch 24d are connected in this order, an end on the electronic switch 24c side is connected to the input terminal 23a and an end on the electronic switch 24d side is connected to the input terminal 23b; a diode 27c having a cathode connected to the input terminal 23a and an anode connected to the connection point between the inductor 25c and the electronic switch 24d; a diode 27d having an anode connected to the input terminal 23b and a cathode connected to the connection point between the inductor 25c and the electronic switch 24c; an inductor 25d having one end connected to the connection point between the inductor 25c and the electronic switch 24d; an output terminal 29b to which the other end of the inductor 25d and the other end of the load 28 are connected; a capacitor 30 connected between the other end of the inductor 25b and the other end of the inductor 25d; and an electronic switch control circuit 31 for controlling the electronic switches 24a, 24b, 24c and 24d to turn on and off, through the control terminals of the electronic switches, to control a switching operation on the DC power supply 22 by an entire electronic switch circuit S1 enclosed by alternate long and short dashed lines in the circuit diagram.

The inductors 25a and 25c used in the specific example herein have an inductance of 200 μH and the inductors 25b and 25d have an inductance of 100 μH. The capacitor 30 has capacitance of 2 μF. The inductors 25a and 25b and the capacitor 30 form a first low-pass filter and the inductors 25c and 25d and the capacitor 30 form a second low-pass filter. The diode 27d, the inductor 25c and the electronic switch 24d form a first closed loop and the diode 27b, the inductor 25a and the electronic switch 24b form a second closed loop.

Herein, the DC power supply 22 for supplying a DC voltage of 350 V is used to generate an AC voltage of 200 V at a frequency of 50 Hz between the output terminals 29a and 29b in the specific example.

An operation of the switching power supply apparatus 21 configured as described above will be described.

The electronic switch control circuit 31 includes a sinusoidal-wave generating circuit 41. The sinusoidal-wave generating circuit 41 generates a sinusoidal wave with a frequency of 50 Hz. The electronic switch control circuit 31 provides the electronic switches 24b and 24d with a square wave for causing the electronic switches 24b and 24d to alternately switch between on and off states at a frequency of 50 Hz (a 20-msec period), on the basis of the sinusoidal wave generated by the sinusoidal-wave generating circuit 41.

The electronic switch control circuit 31 provides the electronic switch 24c with a square wave for turning on and off the electronic switch 24c at a frequency of 20 kHz while the electronic switch 24b is in an on state. When the electronic switch 24b is in an off state, the electronic switch control circuit 31 provides a signal for turning off the electronic switch 24c to the electronic switch 24c. When the electronic switch 24d is in an on state, the electronic switch control circuit 31 provides the electronic switch 24a with a square wave for turning on and off the electronic switch 24a at a frequency of 20 kHz. When the electronic switch 24d is in an off state, the electronic switch control circuit 31 provides a signal for turning off the electronic switch 24a to the electronic switch 24a. The electronic switch control circuit 31 controls the pulse width of the square wave with a frequency of 20 kHz so that the waveform of an output generated between the output terminals 29a and 29b becomes a sinusoidal wave with a frequency of 50 Hz. Pulse width modulation control, for example, may be performed to control the pulse width.

The electronic switch control circuit 31 may have any configuration as long as the signals are generated at the timing as described above and the operating conditions of the signals are satisfied. A description of the configuration will therefore be omitted herein.

In the first half cycle (10-msec) period produced by the square wave with a frequency of 50 Hz from the electronic switch control circuit 31, the electronic switch 24a switches between the on and off states at a frequency of 20 kHz, the electronic switch 24d stays in an on state, and the electronic switches 24c and 24b stay in an off state.

Accordingly, in this period, a current flows from the positive side of the DC power supply 22 to the input terminal 23a, the electronic switch 24a, the inductor 25a, the inductor 25b, the output terminal 29a, the load 28, the output terminal 29b, the inductor 25d, the electronic switch 24d, the input terminal 23b and the negative side of the DC power supply 22 in this order when the electronic switch 24a is in an on state. On the other hand, when the electronic switch 24a is in an off state, energy accumulated in the inductors causes a current to flow through a closed loop made up of the diode 27b, the inductor 25a, the inductor 25b, the output terminal 29a, the load 28, the output terminal 29b, the inductor 25d, and the electronic switch 24d. That is, the current flows through the load 28 in the direction of arrow 33a.

In the next half cycle (10-msec) period, a current flows through the load 28 in the direction of arrow 33b.

In this way, the current flows in the direction of arrow 33a in the first half cycle (10-msec) period and the current flows in the direction of arrow 33b in the next half cycle (10-msec) period. The operation is repeated every half cycle. That is, the first half cycle period in which the current flows in the direction of arrow 33a and a second half cycle period in which the current flows in the direction indicated by arrow 33b are repeated to generate an alternating current with a frequency of 50 Hz between the output terminals 29a and 29b.

As has been described, the inductors 25a and 25b and the capacitor 30 form the first low-pass filter and the inductors 25c and 25d and the capacitor 30 form the second low-pass filter. The first and second low-pass filters attenuate harmonic components caused by the switching operation at a frequency of 20 kHz. As a result, the alternating current provided from the output terminals 29a and 29b to the load 28 becomes a 50-Hz sinusoidal wave which oscillates smoothly.

Since the inductor 25a is inserted in series in a series circuit made up of the DC power supply 22 and the electronic switches 24a and 24b, and the inductor 25c is inserted in series in a series circuit made up of the DC power supply 22 and the electronic switches 24c and 24d, the DC power supply 22 is not short-circuited to generate a surge current.

The reason why an unnecessary current that does not pass through the load is not generated in the switching power supply apparatus 21, unlike in the prior art, will be described.

In the first half cycle (10-msec) period at a frequency of 50 Hz, a current flows through the load 28 in the direction of arrow 33a. At this point, regardless of whether the electronic switch 24a is in an on or off state, the electronic switch 24d is in an on state, and the diode 27d, the inductor 25c and the electronic switch 24d form the first closed loop. Since the first closed loop does not include the inductor 25d through which the current flows in the direction of arrow 33a, no potential difference occurs across a series connection unit made up of the diode 27d and the inductor 25c. Accordingly, unlike in the prior art, an unnecessary current that does not pass through the load is not generated.

Similarly, in the next half cycle (10-msec) period, no potential difference occurs across a series connection unit made up of the diode 27b and the inductor 25a because the second closed loop made up of the diode 27b, the inductor 25a and the electronic switch 24b does not include the inductor 25b through which the current flows in the direction of arrow 33b. Accordingly, unlike in the prior art, an unnecessary current that does not pass through the load is not generated.

As has been described, an unnecessary current does not flow, unlike in the prior art, and therefore a decrease in the efficiency of the switching power supply apparatus 21 is avoided. Heat generation in the switching power supply apparatus 21 is not caused by such an unnecessary current. In the case where a current detected by a current detecting section 32 is fed back to control a current flowing through the load, an excess loop current does not flow and therefore accurate control can be achieved.

Figure 2:
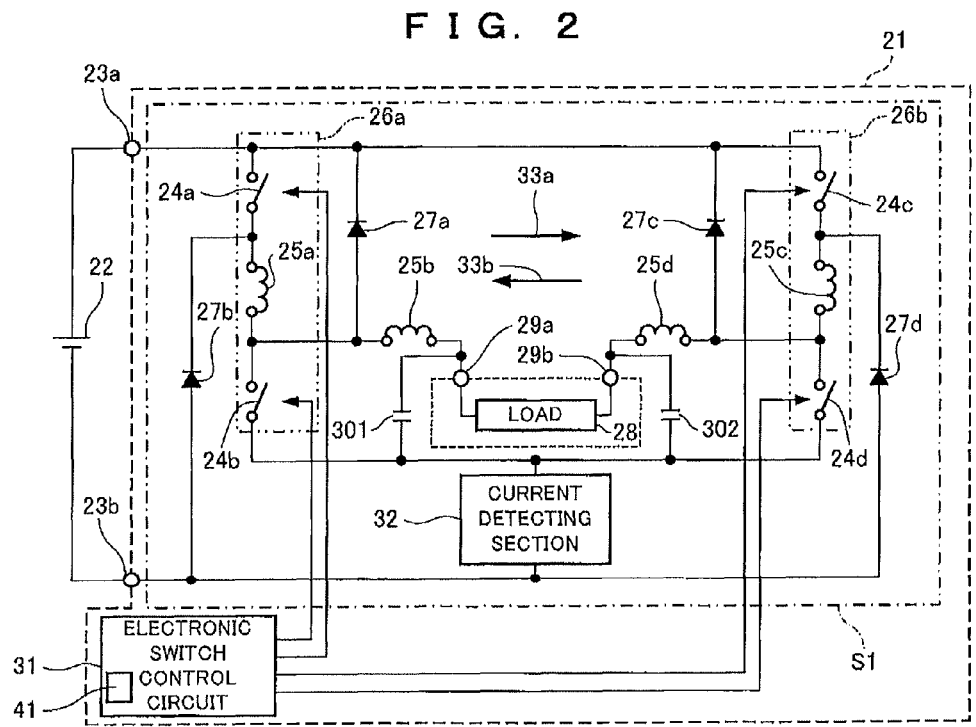
FIG. 2 is a circuit diagram illustrating another configuration example of the switching power supply apparatus according to the first embodiment of the present invention.

The capacitor 30 is connected between the other end of the inductor 25b and the other end of the inductor 25d and is connected in parallel with the load 28 through the output terminals 29a and 29b in the foregoing explanation. An alternative configuration of FIG. 2 can also be implemented and can provide the same advantageous effects as those of the switching power supply apparatus 21 of FIG. 1. In the alternative configuration, a capacitor 301 is connected between the other end of the inductor 25b and the negative side of the DC power supply 22, a capacitor 302 is connected between the other end of the inductor 25d and the negative side of the DC power supply 22, the connection point between the capacitor 301 and the inductor 25b is connected to the one end of the load 28 through the output terminal 29a, and the connection point between the capacitor 302 and the inductor 25d is connected to the other end of the load 28 through the output terminal 29b.

In the foregoing explanation, the electronic switches 24b and 24d are switched alternately between on and off states at a frequency of 50 kHz and, in the period when the electronic switch 24d is in an on state and the electronic switches 24b and 24c are in an off state, the electronic switch 24a is switched at a frequency of 20 kHz, and in the period when the electronic switch 24b is in an on state and the electronic switches 24d and 24a are in an off state, the electronic switch 24c is switched at a frequency of 20 kHz. However, an alternative operation is possible in which the electronic switches 24a and 24c are switched alternately between on and off states at a frequency of 50 Hz and, in the period when the electronic switch 24c is in an on state and the electronic switches 24a and 24d are in an off state, the electronic switch 24b is switched at a frequency of 20 kHz, and in the period when the electronic switch 24a is in an on state and the electronic switches 24c and 24b are in an off state, the electronic switch 24d is switched at a frequency of 20 kHz. The operation also produces the above-described advantageous effects.

Second Embodiment

A switching power supply apparatus according to a second embodiment of the present invention will be described. The same members as those described in the first embodiment are denoted by the same reference numerals to simplify the description of the members.

Figure 3:
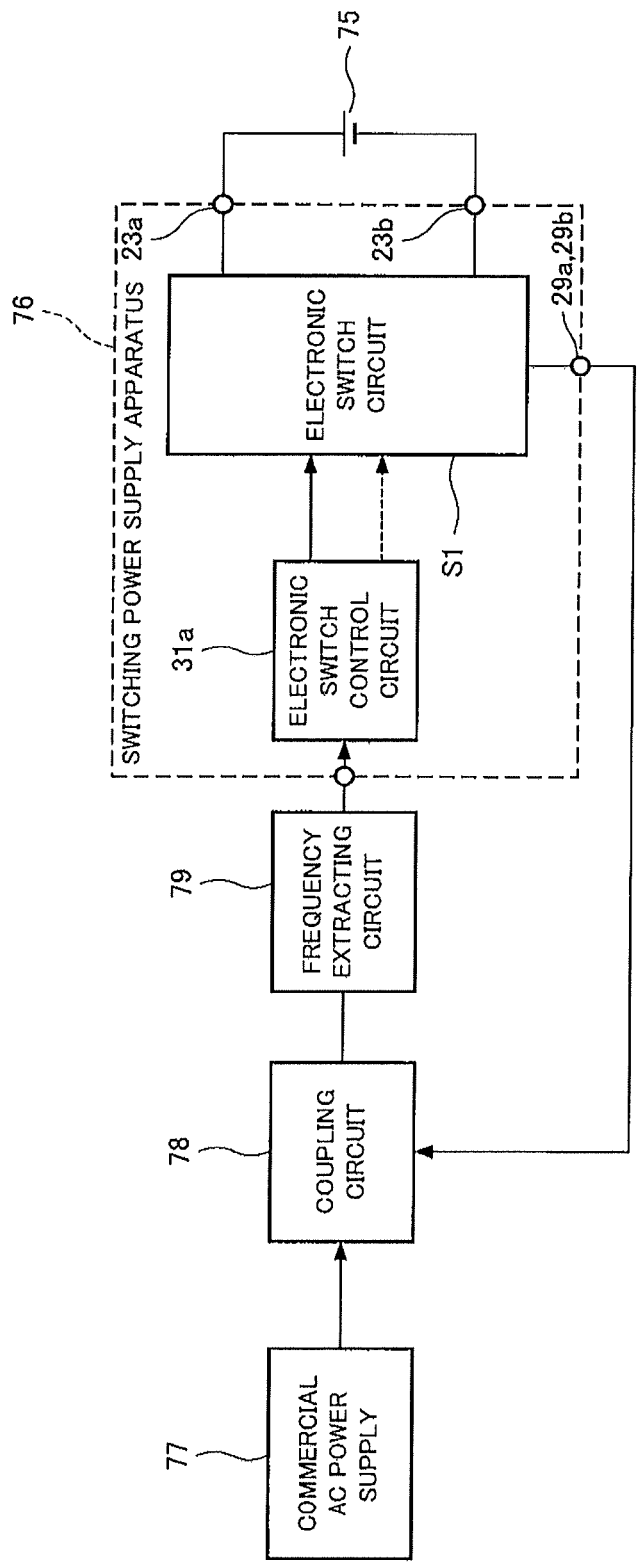
FIG. 3 is a block diagram illustrating a configuration example of a switching power supply apparatus and the peripheral elements of the apparatus according to a second embodiment of the present invention.
Figure 4:
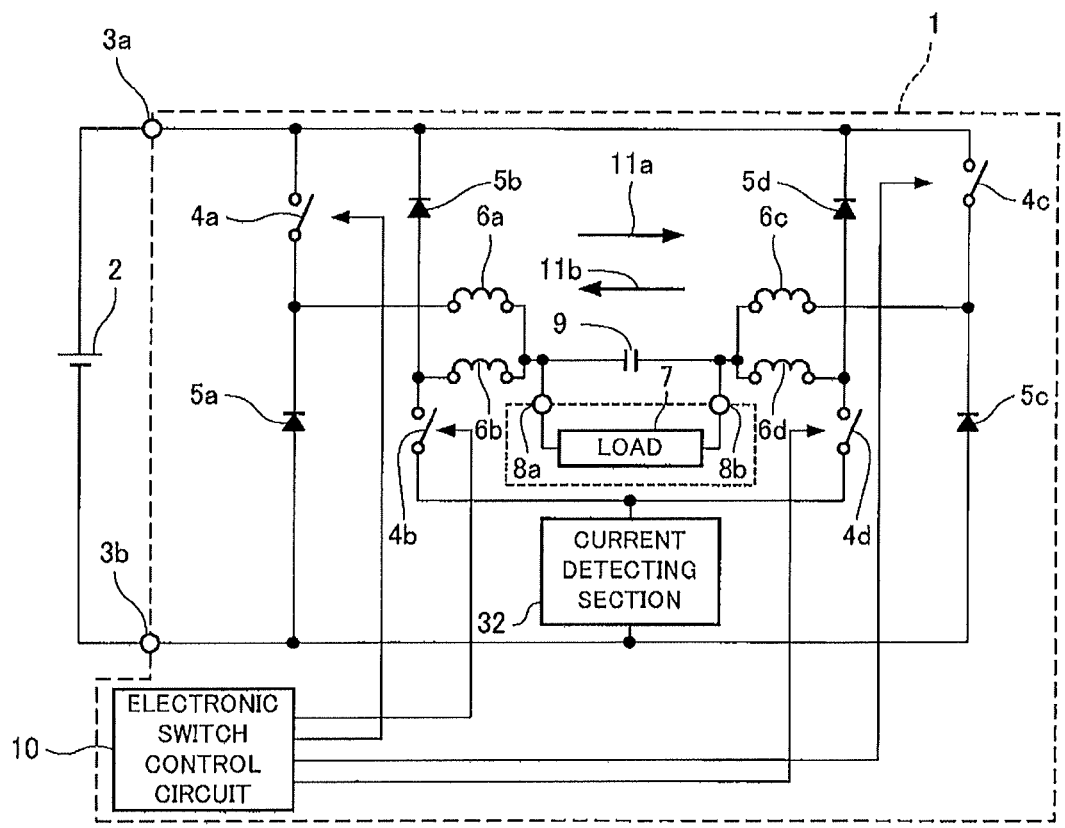
FIG. 4 is a circuit diagram illustrating the configuration of a conventional switching power supply apparatus.

FIG. 3 is a block diagram illustrating a configuration example of the switching power supply apparatus of the second embodiment and the peripheral elements of the apparatus. The second embodiment will be described with respect to a case in which a solar cell is used as a DC power supply connected to the switching power supply apparatus.

A switching power supply apparatus 76 of FIG. 3 corresponds to the switching power supply apparatus 21 of the first embodiment. Input terminals 23a and 23b of the switching power supply apparatus 76 are connected to a solar cell 75 which is a DC power supply. The solar cell 75 converts the energy of sunlight to a DC output. The solar cell 75 may be attached to the roof of an ordinary house, for example. Output terminals 29a and 29b of the switching power supply apparatus 76 are connected to a commercial AC power supply 77, which is a load, through a coupling circuit 78.

An output from the commercial AC power supply 77 is provided to the coupling circuit 78. The coupling circuit 78 couples an output from the switching power supply apparatus 76 with the output from the commercial AC power supply 77 and provides the coupled output to a frequency extracting circuit 79. The output from the frequency extracting circuit 79 is provided to an electronic switch control circuit 31a in the switching power supply apparatus 76. The electronic switch control circuit 31a differs from the electronic switch control circuit 31 described in the first embodiment in that the electronic switch control circuit 31a uses the output from the frequency extracting circuit 79 instead of the output from the sinusoidal-wave generating circuit 41.

An operation of the switching power supply apparatus 76 configured thus will be described.

First, the frequency extracting circuit 79 provides an output with the same frequency as the output of the commercial power supply 77 to the electronic switch control circuit 31a. The electronic switch control circuit 31a controls the switching operation of an electronic switch circuit S1 so that an alternating current with the same frequency as the output of the frequency extracting circuit 79 is generated between the output terminals 29a and 29b. Accordingly, the output from the switching power supply apparatus 76 has the same frequency as the output from the commercial AC power supply 77. The electronic switch control circuit 31a also controls the switching operation of the electronic switch circuit S1 so that the output of the switching power supply apparatus 76 has the same phase as the phase of the output from the commercial AC power supply 77. Therefore, in the coupling circuit 78, the output from the switching power supply apparatus 76, that is, the energy of sunlight, can be efficiently superimposed on the output from the commercial AC power supply 77.

As has been described, the switching power supply apparatus 76 of the present embodiment is capable of using the energy of sunlight which exists in nature to generate a commercial alternating current and therefore contributes to power saving at home and serves as a nature-friendly energy source.

For example, the switching power supply apparatus 76 of the present embodiment can be used in a system that uses electric power obtained by solar-electric power generation in combination with a commercial AC power supply and switches between the power supplies to supply electric power to electric appliances in the home. The switching power supply apparatus 76 of the present embodiment can also be used in a system that sells excess of electric power obtained by solar-electric power generation to a commercial AC power supplier.

INDUSTRIAL APPLICABILITY

The switching power supply apparatus of the present invention is capable of suppressing heat generation from a power supply to improve conversion efficiency in a power supply operation. In addition, when switching is controlled by detecting a current flowing through a load, the switching power supply apparatus is capable of accurately detecting only the current flowing through the load to achieve more stable control and reducing unnecessary power consumption. Therefore, the present invention can be applied to power consumption reduction technology in a power supply apparatus for electronic devices such as consumer electric appliances.

The invention claimed is:

1. A switching power supply apparatus for converting a first output having a DC waveform supplied from a DC power supply to a second output having an AC waveform and supplying the second output to a load, the switching power supply apparatus comprising:

a first series connection unit in which a first electronic switch, a first inductor and a second electronic switch are connected in this order, an end on a first electronic switch side is connected to a positive side of the DC power supply and an end on a second electronic switch side is connected to a negative side of the DC power supply;

a first diode having a cathode connected to the positive side of the DC power supply and an anode connected to a connection point between the first inductor and the second electronic switch;

a second diode having an anode connected to the negative side of the DC power supply and a cathode connected to a connection point between the first electronic switch and the first inductor;

a second inductor having one end connected to the connection point between the first inductor and the second electronic switch;

a second series connection unit in which a third electronic switch, a third inductor and a fourth electronic switch are connected in this order, an end on a third electronic switch side is connected to the positive side of the DC power supply and an end on a fourth electronic switch side is connected to the negative side of the DC power supply;

a third diode having a cathode connected to the positive side of the DC power supply and an anode connected to a connection point between the third indictor and the fourth electronic switch;

a fourth diode having an anode connected to the negative side of the DC power supply and a cathode connected to a connection point between the third electronic switch and the third inductor;

a fourth inductor having one end connected to the connection point between the third inductor and the fourth electronic switch;

a capacitor connected between an other end of the second inductor and an other end of the fourth inductor; and an electronic switch control circuit for causing only the first electronic switch to perform a switching operation during a period in which the second electronic switch is held in an off state and the fourth electronic switch is held in an on state and causing only the third electronic switch to perform a switching operation during a period in which the second electronic switch is held in an on state and the fourth electronic switch is held in an off state, wherein the load is connected between the other end of the second inductor and the other end of the fourth inductor, and the electronic switch control circuit causes the first and third electronic switches to repeatedly switch between on and off at a frequency higher than a frequency of the second output supplied to the load and causes the second and fourth electronic switches to alternately switch between an on state and an off state at the frequency of the second output.

2. A switching power supply apparatus for converting a first output having a DC waveform supplied from a DC power supply to a second output having an AC waveform and supplying the second output to a load, the switching power supply apparatus comprising:

a first series connection unit in which a first electronic switch, a first inductor and a second electronic switch are connected in this order, an end on a first electronic switch side is connected to a positive side of the DC power supply and an end on a second electronic switch side is connected to a negative side of the DC power supply;

a first diode having a cathode connected to the positive side of the DC power supply and an anode connected to a connection point between the first inductor and the second electronic switch;

a second diode having an anode connected to the negative side of the DC power supply and a cathode connected to a connection point between the first electronic switch and the first inductor;

a second inductor having one end connected to the connection point between the first inductor and the second electronic switch;

a second series connection unit in which a third electronic switch, a third inductor and a fourth electronic switch are connected in this order, an end on a third electronic switch side is connected to the positive side of the DC power supply and an end on a fourth electronic switch side is connected to the negative side of the DC power supply;

a third diode having a cathode connected to the positive side of the DC power supply and an anode connected to a connection point between the third indictor and the fourth electronic switch;

a fourth diode having an anode connected to the negative side of the DC power supply and a cathode connected to a connection point between the third electronic switch and the third inductor;

a fourth inductor having one end connected to the connection point between the third inductor and the fourth electronic switch;

a capacitor connected between an other end of the second inductor and an other end of the fourth inductor; and an electronic switch control circuit for causing only the second electronic switch to perform a switching operation during a period in which the first electronic switch is held in an off state and the third electronic switch is held in an on state and causing only the fourth electronic switch to perform a switching operation during a period in which the first electronic switch is held in an on state and the third electronic switch is held in an off state, wherein the load is connected between the other end of the second inductor and the other end of the fourth inductor, and the electronic switch control circuit causes the second and fourth electronic switches to repeatedly switch between on and off at a frequency higher than a frequency of the second output supplied to the load and causes the first and third electronic switches to alternately switch between an on state and an off state at the frequency of the second output.

3. A switching power supply apparatus for converting a first output having a DC waveform supplied from a DC power supply to a second output having an AC waveform and supplying the second output to a load, the switching power supply apparatus comprising:

a first series connection unit in which a first electronic switch, a first inductor and a second electronic switch are connected in this order, an end on a first electronic switch side is connected to a positive side of the DC power supply and an end on a second electronic switch side is connected to a negative side of the DC power supply;

a first diode having a cathode connected to the positive side of the DC power supply and an anode connected to a connection point between the first inductor and the second electronic switch;

a second diode having an anode connected to the negative side of the DC power supply and a cathode connected to a connection point between the first electronic switch and the first inductor;

a second inductor having one end connected to the connection point between the first inductor and the second electronic switch;

a second series connection unit in which a third electronic switch, a third inductor and a fourth electronic switch are connected in this order, an end on a third electronic switch side is connected to the positive side of the DC power supply and an end on a fourth electronic switch side is connected to the negative side of the DC power supply;

a third diode having a cathode connected to the positive side of the DC power supply and an anode connected to a connection point between the third indictor and the fourth electronic switch;

a fourth diode having an anode connected to the negative side of the DC power supply and a cathode connected to a connection point between the third electronic switch and the third inductor;

a fourth inductor having one end connected to the connection point between the third inductor and the fourth electronic switch;

a first capacitor connected between an other end of the second inductor and the negative side of the DC power supply;

a second capacitor connected between an other end of the fourth inductor and the negative side of the DC power supply; and an electronic switch control circuit for causing only the first electronic switch to perform a switching operation during a period in which the second electronic switch is held in an off state and the fourth electronic switch is held in an on state and causing only the third electronic switch to perform a switching operation during a period in which the second electronic switch is held in an on state and the fourth electronic switch is held in an off state, wherein the load is connected between the other end of the second inductor and the other end of the fourth inductor; and the electronic switch control circuit causes the first and third electronic switches to repeatedly switch between on and off at a frequency higher than a frequency of the second output supplied to the load and causes the second and fourth electronic switches to alternately switch between an on state and an off state at the frequency of the second output.

4. A switching power supply apparatus for converting a first output having a DC waveform supplied from a DC power supply to a second output having an AC waveform and supplying the second output to a load, the switching power supply apparatus comprising:

a first series connection unit in which a first electronic switch, a first inductor and a second electronic switch are connected in this order, an end on a first electronic switch side is connected to a positive side of the DC power supply and an end on a second electronic switch side is connected to a negative side of the DC power supply;

a first diode having a cathode connected to the positive side of the DC power supply and an anode connected to a connection point between the first inductor and the second electronic switch;

a second diode having an anode connected to the negative side of the DC power supply and a cathode connected to a connection point between the first electronic switch and the first inductor;

a second inductor having one end connected to the connection point between the first inductor and the second electronic switch;

a second series connection unit in which a third electronic switch, a third inductor and a fourth electronic switch are connected in this order, an end on a third electronic switch side is connected to the positive side of the DC power supply and an end on a fourth electronic switch side is connected to the negative side of the DC power supply;

a third diode having a cathode connected to the positive side of the DC power supply and an anode connected to a connection point between the third indictor and the fourth electronic switch;

a fourth diode having an anode connected to the negative side of the DC power supply and a cathode connected to a connection point between the third electronic switch and the third inductor;

a fourth inductor having one end connected to the connection point between the third inductor and the fourth electronic switch;

a first capacitor connected between an other end of the second inductor and the negative side of the DC power supply;

a second capacitor connected between an other end of the fourth inductor and the negative side of the DC power supply; and an electronic switch control circuit for causing only the second electronic switch to perform a switching operation during a period in which the first electronic switch is held in an off state and the third electronic switch is held in an on state and causing only the fourth electronic switch to perform a switching operation during a period in which the first electronic switch is held in an on state and the third electronic switch is held in an off state, wherein the load is connected between the other end of the second inductor and the other end of the fourth inductor, and the electronic switch control circuit causes the second and fourth electronic switches to repeatedly switch between on and off at a frequency higher than a frequency of the second output supplied to the load and causes the first and third electronic switches to alternately switch between an on state and an off state at the frequency of the second output.

5. The switching power supply apparatus according to claim 1, wherein the DC power supply is a solar cell, the load is a commercial AC power supply, and the electronic switch control circuit controls a time at which the second and fourth electronic switches switch between on and off states, on the basis of a frequency of the commercial AC power supply.

6. The switching power supply apparatus according to claim 2, wherein the DC power supply is a solar cell, the load is a commercial AC power supply, and the electronic switch control circuit controls a time at which the first and third electronic switches switch between the on and off states, on the basis of a frequency of the commercial AC power supply.

7. The switching power supply apparatus according to claim 3, wherein the DC power supply is a solar cell, the load is a commercial AC power supply, and the electronic switch control circuit controls a time at which the second and fourth electronic switches switch between on and off states, on the basis of a frequency of the commercial AC power supply.

8. The switching power supply apparatus according to claim 4, wherein the DC power supply is a solar cell, the load is a commercial AC power supply, and the electronic switch control circuit controls a time at which the first and third electronic switches switch between on and off states, on the basis of a frequency of the commercial AC power supply.

* * * * *